United States Patent Office 3,494,187
Patented Feb. 10, 1970

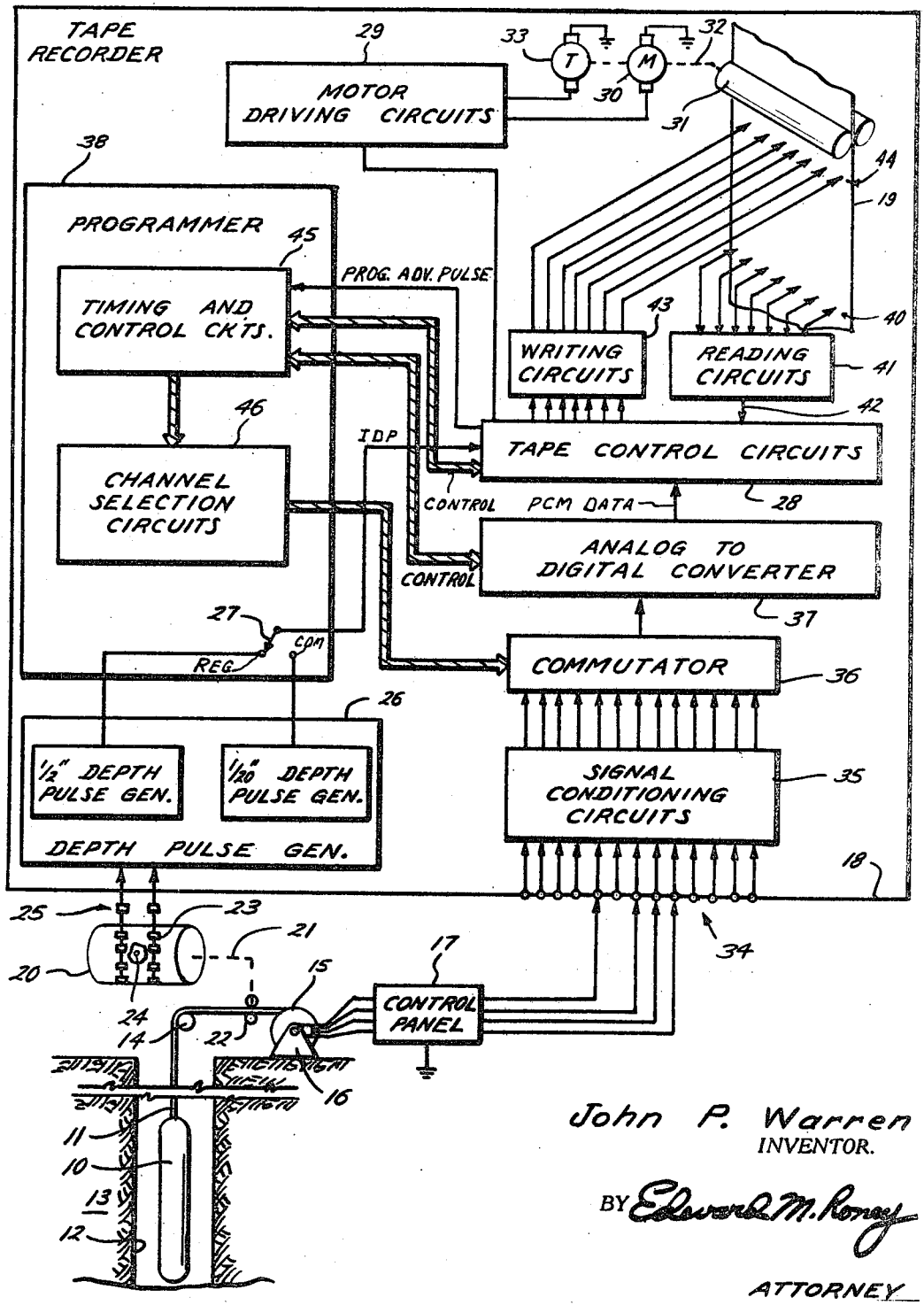

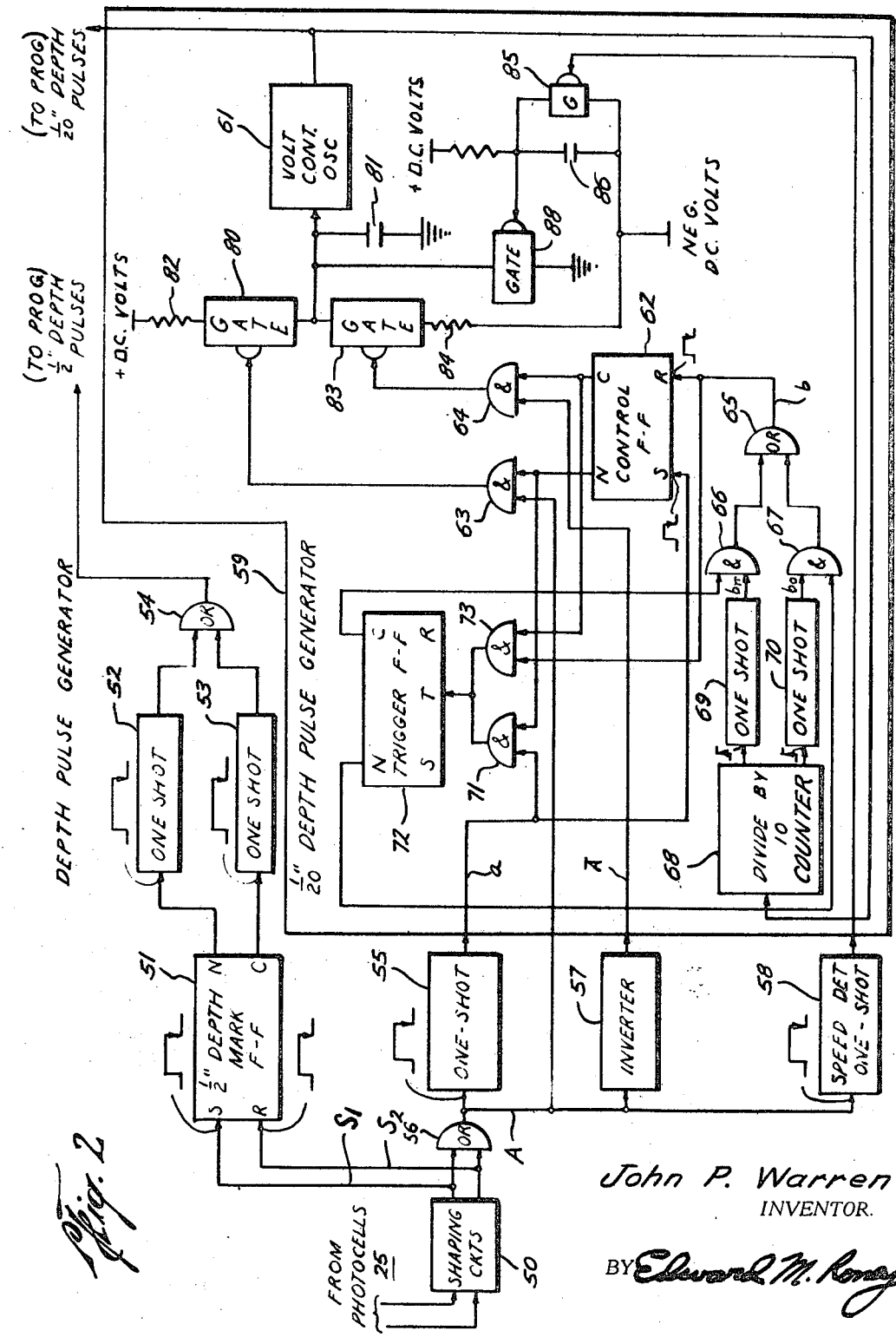

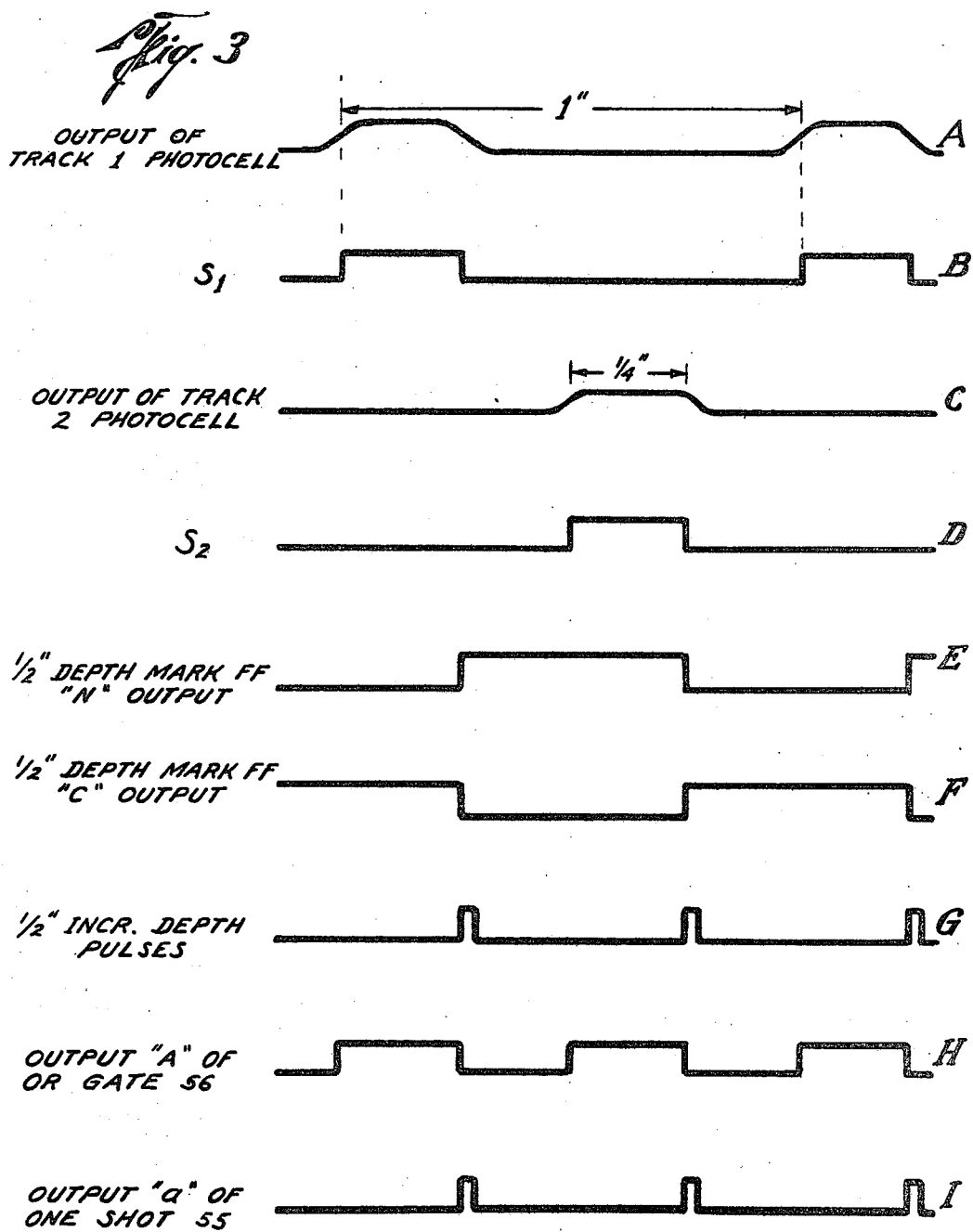

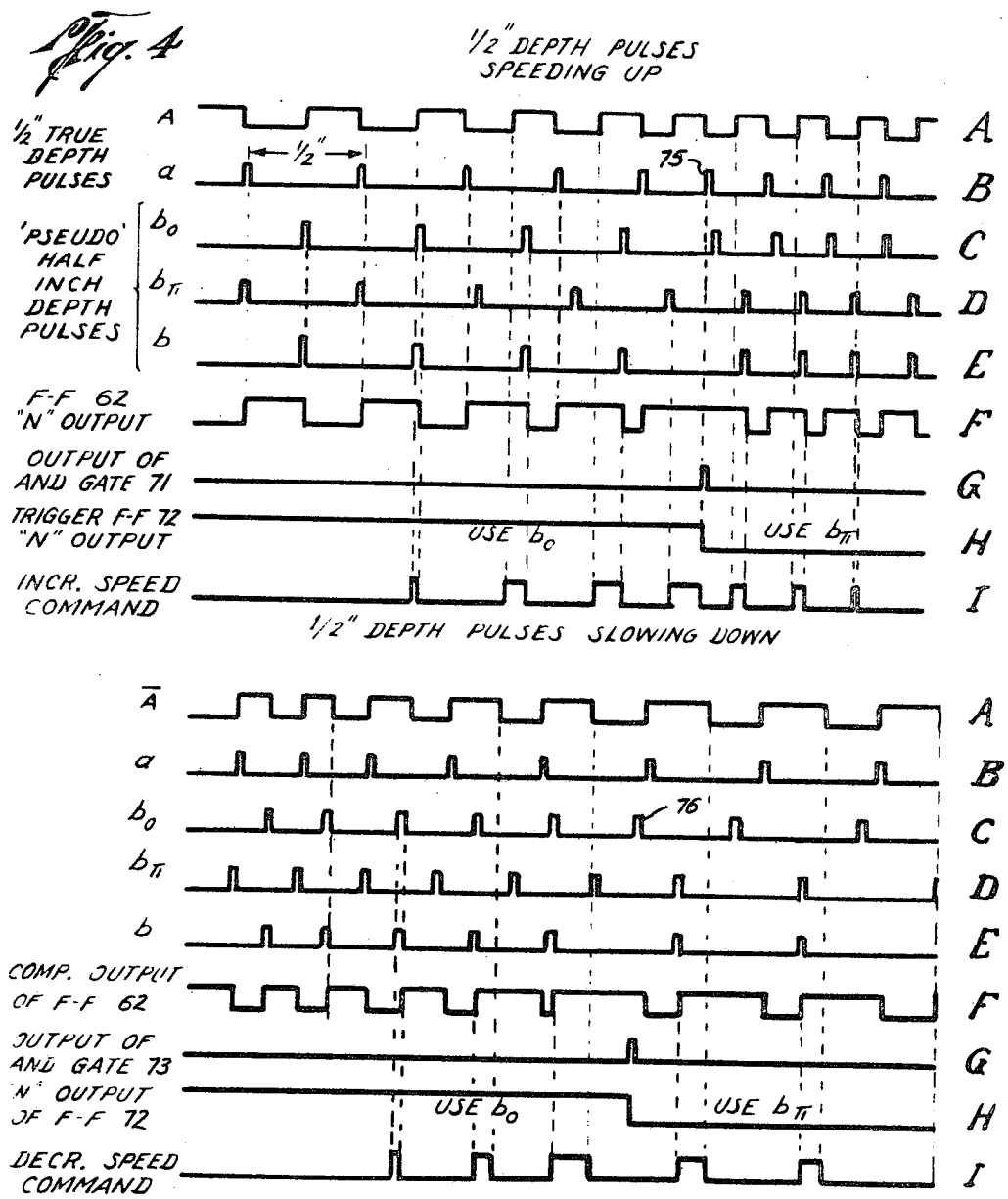

3,494,187
METHODS AND APPARATUS FOR USE IN
PROCESSING WELL LOGGING DATA
John P. Warren, Ridgefield, Conn., assignor to Schlumberger Technology Corporation, New York, N.Y., a corporation of Texas
Original application Feb. 6, 1968, Ser. No. 703,428. Divided and this application Dec. 30, 1968, Ser. No. 787,721
Int. Cl. E21b 49/00; G01v 1/40
U.S. Cl. 73—152                                    25 Claims

ABSTRACT OF THE DISCLOSURE

In accordance with an illustrative embodiment of the present invention, a variable rate incremental depth pulse generator for use with well logging tape recording apparatus is adapted for generating incremental depth pulses at any of a plurality of selectable rates. An optical slotted drum arrangement produces pulses representative of each ½-inch of movement of a cable which supports a well tool in a borehole. To produce shorter interval, high frequency incremental depth pulses, the low frequency ½-inch incremental depth pulses are used in a digital phase locked loop arrangement. By so doing, cable reversals or jitter will not cause a rash of the high frequency depth pulses to be generated.

---

This application is a division of application Ser. No. 703,428 filed by Gerald K. Miller et al. on Feb. 6, 1968. This invention relates to methods and apparatus for generating signals representative of the rate of movement of a well tool through a borehole and more particularly to methods and apparatus for generating signals which operates a tape recorder as a function of the movement of a well tool through a borehole.

In the logging of wells, there are a variety of different measurements derived from different tools which a general purpose tape recorder should be able to handle. For example, a general purpose tape recorder may be called upon to record measurements derived from so-called "regular" type of well tools such as those which produce measurements of the resistivity, acoustic travel time, density, natural radioactivity, etc. of a formation. Many times, a plurality of exploring devices for making these measurements may be mounted on one support member so as to derive a plurality of such measurements during one trip in a borehole.

In addition to these "regular" logs, so-called "dipmeter" surveys of the dip of formations surrounding a borehole are oftentimes run. In present day practice, the dipmeter tools for making these surveys take the form of a plurality of resistivity type exploring devices mounted on wall-engaging pad members which operate to derive measurements of the formation resistivity at various circumferentially spaced locations around the borehole wall. The measurements from each of the pad mounted exploring devices can then be correlated, as by a digital computer, to produce an indication of the formation dip relative to the orientation of the well tool. Moreover, it is usually necessary to produce a measurement of the borehole diameter for use in this correlation. To reference this dip indication to true vertical (i.e., the gravitational axis) and an azimuthal reference direction, measurements of the azimuth, inclination and relative bearing of the tool must usually be made.

Since for the accurate determination of dip, the formation resistivity at small depth increments must be known, it is important that these resistivity measurements be frequently sampled and digitized, usually at a sampling rate far in excess of that necessary for regular logs. This, coupled with the large number of measurements made with dipmeter tools, requires a very fast sampling rate. On the other hand, the amplitude resolution necessary for regular logs is usually greater than that for dipmeter logs. Thus, a truly general purpose well logging tape recorder must satisfy these two different considerations, i.e., resolution in the depth domain for dipmeter logs and in the amplitude domain for regular logs.

Copending application Ser. No. 787,683 filed by Gerald K. Miller on Dec. 30, 1968, describes an adjustable duty cycle analog-to-digital converter which has a large duty cycle for regular logs to produce greater amplitude resolution, thus generally requiring a slow sampling rate, and a small duty cycle for dipmeter logs to enable greater depth resolution by allowing for more frequent sampling. However, it is at the same time necessary for such a general purpose tape recorder to have a means for enabling such a variable sampling rate.

One way in which this adjustable sampling rate could be produced is to generate a pulse for each given increment of well tool movement or cable travel and then divide these pulses by a suitable factor to produce the desired sampling rate. Unfortunately, the sampling rate required for most dipmeter applications is too high for practical implementation of such an incremental depth pulse generator. For one thing, if such an incremental depth pulse generator were adapted to provide depth pulses at small increments of cable movement, the not-infrequently occurring cable reversals or backlashes may well produce a large number of erroneous depth pulses.

It is an object of the invention to provide new and improved methods and apparatus for use in the processing of well logging signals as a function of the movement of a well tool.

Another object is to provide new and improved methods and apparatus for producing incremental depth pulses for use in processing all types of well logging signals, including those derived from so-called dipmeter tools.

In accordance with the present invention, methods and apparatus for generating a signal representative of the movement of a cable supported well tool through a borehole comprises generating a cable movement signal having a frequency representative of the rate of the movement of the cable and generating a multiple frequency signal at a multiple of the frequency of the cable movement signal. The frequency of the multiple frequency signal is then divided so that the frequency of this divided frequency signal will be near the frequency of the cable movement signal and the cable movement signal is compared with the divided frequency signal to produce a signal for use in controlling the frequency of the multiple frequency signal. By so doing, the frequency of the divided frequency signal will be substantially the same as the frequency of the cable movement signal so that the frequency of the multiple frequency signal will accurately reflect the rate of cable movement.

For a better understanding of the present invention, together with other and further objects thereof, reference is had to the following description taken in connection with the accompanying drawings, the scope of the invention being pointed out in the appended claims.

Referring to the drawings:

FIGURE 1 shows in a schematic manner a borehole investigating system along with a schematic representation of a magnetic tape recording system in which the digitizer of the present invention can find use;

FIGURE 2 schematically shows an incremental depth pulse generator for use with the tape recording apparatus of FIGURE 1 in accordance with the present invention;

FIGURES 3A–3I show timing waveform diagrams useful in understanding the operation of a portion of the incremental depth pulse generator of FIGURE 2;

FIGURES 4A–4I show timing waveform diagrams depicting the operation of the depth pulse generator of FIGURE 2 when the cable movement is increasing; and FIGURES 5A–5I show waveform timing diagrams depicting the operation of the depth pulse generator of FIGURE 2 when the cable movement is decreasing.

Referring to FIGURE 1, there is shown a downhole investigating means 10 which is supported on the end of an armored cable 11 in a borehole 12 for investigating subsurface earth formations 13. The downhole exploring means 10 may include one or more investigating devices for investigating different characteristics of the subsurface earth formations. These devices may include various electrode arrays and coil arrays for measuring the electrical resistivities or conductivities of the subsurface formations, various radioactivity devices for measuring different nuclear phenomena in a borehole, various acoustic measuring devices, or any combination of these or other borehole measuring devices.

At the surface of the earth, the cable 11 passes over a sheave wheel 14 and is secured to a drum and winch mechanism 15. The drum and winch mechanism 15 includes a suitable brush and slip ring arrangement 16 for providing electrical connections between the cable conductors and a control panel 17. The control panel 17 suitably includes a power supply for supplying power to the downhole exploring means and suitable electronic circuitry for receiving indications of the parameters measured by the various downhole investigating devices and preparing these well logging signals for application to other circuits.

The surface apparatus also includes a tape recorder 18 for recording the well logging signals derived from the downhole exploring means 10 in digital form on a magnetic tape 19. To control the operation of the tape recorder 18 as a function of borehole depth, a slotted drum 20 is driven by a rotating shaft 21 from a lower driving wheel 22. A plurality of optical slots 23 are cut in the outer periphery of the slotted drum 20 so that light from a central light source 24 can pass through the slots 23 to a pair of photocells 25 so as to provide electrical signals at given increments of depth to a depth pulse generating circuit 26. The slots in the slotted drum 20 make up two separate tracks, the slots in each track being 1-inch of cable travel apart and staggered from one track to the next so that there will be a slot in one or the other track each ½-inch of cable travel.

The depth pulse generating circuit 26 includes two related circuits for generating depth pulses at depth intervals of either ½-inch or $\frac{1}{20}$-inch depending on the type of well logging signal to be recorded. More specifically, when recording the regular type of logging signal, such as induction logging, sonic logging, etc., the ½-inch depth pulses are selected via a switch 27. The $\frac{1}{20}$-inch depth pulses are selected when recording dipmeter signals derived from one type of dipmeter tool known as the "continuous dipmeter tool" (CDM), because the resolution of the dipmeter signals in the depth domain must be very high in order to accurately determine the dip of the formations adjoining the borehole. Thus, more frequent data sampling is necessary in this specialized case.

The selected depth pulse, designated incremental depth pulse (IDP), is supplied to tape control circuits 28 to initiate the recording operation. This incremental depth pulse causes a signal to be applied from the tape control circuits 28 to a motor driving circuit 29 for energizing a motor 30 which moves the recording tape via a tape capstan driven by a shaft 32. The shaft 32 also drives a tachometer 33 which supplies an electrical signal proportional to the speed of rotation of the shaft 32, and thus the tape velocity, to the motor driving circuit 29 for feedback control purposes.

Concerning the data processing features of the tape recorder 18, the analog well logging signals from the control panel 17 are applied to selected input terminals 34 of the tape recorder 18 for application to a plurality of signal conditioning circuits 35 which function to convert the well logging signals to a form suitable for processing by the tape recorder 18. Each input terminal represents a different channel of the tape recorder. As many channels up to the maximum available may be used at one time as is desired. The parallel analog output signals from signal conditioning circuits 35 are sequentially sampled by a commutator 36 for application to an analog-to-digital converter 37. More specifically, a programmer 38 sends a channel designation to the commutator 36 for connecting selected ones of the input terminals 34 to the analog-to-digital converter 37. Each sampled well logging signal is then digitized by the analog-to-digital converter 37. Upon completion of digitizing each sampled signal, the A/D converter 37 signals the programmer 38 of this event which then causes the newly digitized data word to be serially shifted to the tape control circuits for recording on the magnetic tape 19.

To control the recording of data on the magnetic tape 19, as well as various other functions within the tape recorder 18, magnetic marks already recorded on the magnetic tape 19 are utilized. To facilitate operation, the first time data is recorded on any given tape, magnetic marks are desirably prerecorded thereon. These prerecorded magnetic marks need only be recorded in one track of the tape 19. A plurality of reading heads 40 are located in suitable relationship to the tape 19 so as to detect the magnetic flux therein. These reading heads 40 are connected to a plurality of reading circuits 41 which supply a "detected mark" indication to the tape control circuits 28 via a conductor 42. These "detected mark" pulses are ultimately used to generate inscribing pulses for converting the data word to the tape format and writing the data on the magnetic tape 19 via a plurality of writing circuits 43 and writing heads 44.

Selected ones of the "detected mark" pulses are utilized to generate "program advance pulses" for application to the timing and control circuits 45 of the programmer 38. These "program advance pulses" are generated as each data word is written on tape and are utilized to advance a sequence or word counter in the timing control circuits 45 to activate the A/D converter 37. This sequence counter causes channel selection circuits 46 to instruct the commutator 36 to select the proper analog signal for application to the analog-to-digital converter 37. The timing and control circuits 45 also control the transfer of data from the A/D converter 37 to the other circuits in response to an "end A/D conversion pulse" from the A/D converter 37. For a more detailed description of the various circuits of the FIGURE 1 tape recorder, refer to copending application Ser. No. 703,428 filed by Gerald K. Miller et al. on Feb. 6, 1968.

Before discussing the details of the incremental depth pulse generator circuit of the present invention, it would first be desirable to discuss some general considerations. The tape recording apparatus of FIGURE 1 has three different modes of operation. These are the regular logging mode, designated REG, for recording the regular type of well logging signals (e.g., induction log, sonic log, neutron log, etc.), the CDM mode of operation for recording well logging signals derived from the so-called "continuous dipmeter tool," and the HDT mode for recording well logging signals derived from the so-called "high resolution dipmeter tool." The various features of the so-called "CDM" tool can be found in U.S. Patent No. 2,746,162 granted to M. F. B. Picard on May 22, 1956, and U.S. Patent No. 2,427,950 granted to H. G. Doll on Sept. 23, 1947. The features of the so-called "HDT" tool can be found in copending application Ser. No. 219,619 by A. M. Vezin filed on Aug. 27, 1962. The requirements for the three modes are substantially different. For example, the sampling rate for the dipmeter modes should be much higher than that for the regular logging mode. Thus, the depth increments of the incremental depth pulses must be much shorter for dipmeter logs than for regular logs, i.e., the sampling rate must be faster.

Now referring to FIGURE 2, there is shown the depth pulse generator 26 of FIGURE 1 for producing incremental depth pulses at selected rates. The tracks 1 and 2 photocells 25, supply the pulses shown in FIGURES 3A and 3C to suitable shaping circuits 50 upon the slots in the optical slotted drum 20 of FIGURE 1 lining up with the light source 24. The shaping circuits 50 act to square-up the pulses from the photocells 25 and could comprise a pair of Schmitt triggers, for example. The trailing edges of the square wave output pulses from the shaping circuits 50, shown in FIGURES 3B and 3C, designated $S_1$ and $S_2$ (the subscripts correspond to the drum track) set and reset a flip-flop 51, designated "½-inch depth mark flip-flop." The trailing edges of the normal and complementary outputs of flip-flop 51 (shown in FIGURES 3E and 3F respectively) energize a pair of one-shots 52 and 53 respectively. The output pulses from these two one-shots 52 and 53 are OR-gated to the programmer 38 as "½-inch incremental depth pulses" via an OR gate 54 and are shown in FIGURE 3G.

Since the spacing between slots on the drum 20 represents 1-inch of cable travel, as seen in FIGURE 3A, and the slots of the second track are intermediate of the slots of the first track, it is clear that the depth pulses of FIGURE 3G will be truly ½-inch apart. Additionally, since the pulses $S_1$ of FIGURE 3B set the flip-flop 51 and the pulses $S_2$ of FIGURE 3D reset it, the optical slotted drum can reverse direction for some distance before an erroneous ½-inch depth pulse is generated since the flip-flop 51 has memorized which track generated the last pulse and will not change states until the other track generates a pulse.

Now concerning the generation of the "$\frac{1}{20}$-inch incremental depth pulses," the trailing or falling edges of the pulses from the shaping circuits 50 energize a one-shot 55 after passing through an OR gate 56. These pulses from OR gate 56 are designated A and are shown in FIGURE 3H. The pulses from one-shot 55 are designated $a$ and are shown in FIGURE 3I. The pulses from OR gate 56 are also inverted by an inverter circuit 57 for application to other circuits and are also utilized to energize a "speed detector discharge one-shot" 58. The output pulse $a$ from one-shot 55, the output pulses A from OR gate 56, the output pulses from "speed detector discharge one-shot" 58, and the inverted pulses $\overline{A}$ from inverter 57 are all applied to a "$\frac{1}{20}$-inch depth pulse generator" 59.

Now concerning the "$\frac{1}{20}$-inch depth pulse generator," a voltage controlled oscillator 61 generates the "$\frac{1}{20}$-inch incremental depth pulses" under the control of a digital phase locked loop. Concerning the control of the voltage controlled oscillator 61, a "control flip-flop" 62 operates in conjunction with a pair of AND gates 63 and 64 to increase or decrease the frquency of the oscillator 61. To accomplish this, the trailing edge of the pulse $a$ from one-shot 55 set the "control flip-flop" 62 which is reset by the trailing edge of a pulse designated $b$ from an OR gate 65. To produce this $b$ pulse, one of a pair of AND gates 66 or 67 is enabled to allow a pulse designated $b_\pi$ or $b_0$ respectively to pass through OR gate 65 to reset flip-flop 62. To generate these pulses $b_\pi$ and $b_0$, the voltage controlled oscillator 61, which generates the "$\frac{1}{20}$-inch depth pulses," supplies these "$\frac{1}{20}$-inch depth pulses" to the input of a "divide by 10" circuit 68 to provide pseudo ½-inch depth signals. The normal and complementary outputs of the last flip-flop of the "divide by 10" counter 68 are supplied to a pair of one-shots 69 and 70 respectively which are triggered on the rising edge of the normal and complemented pulse outputs respectively of circuit 68. The output of one-shot 69 is designated $b_\pi$ and the output of one-shot 70 is designated $b_0$. Only one of these two pulses, $b_0$ or $b_\pi$, is selected as the $b$ pulse by AND gates 66 and 67 for resetting the control flip-flop 62. This $b$ pulse is, in effect, a pseudo ½-inch pulse and represents the estimation by the oscillator 61 as to the time interval between ½-inch of travel by the downhole exploring means. These $b$ pulses are then compared with the true ½-inch depth pulses $a$ through the action of the "control flip-flop" 62 and appropriate corrections made to the oscillator 61 so that the pseudo ½-inch $b$ pulses will be in synchronism with the true ½-inch $a$ pulses. To accomplish this, the normal output of the "control flip-flop" 62 and the output A from OR gate 56 are supplied to the input of AND gate 63 which generates an "increase speed" signal in response to a coincidence between the two applied input signals. The complementary output of "control flip-flop" 62 and the output pulse $\overline{A}$ from inverter 57 are applied to the inputs of the AND gate 64 which, when coincidence occurs, generates a "decrease speed" signal.

To control which one of the $b$ pulses, i.e., $b_0$ or $b_\pi$, is selected to reset the "control flip-flop" 141, the normal output of "control flip-flop" 62 and the output $a$ from one-shot 55 are applied to the input of an AND gate 71 whose output is utilized to trigger a "trigger flip-flop" 72 when coincidence occurs. In a similar fashion, the complementary output of "control flip-flop" 62 and the output pulse $b$ from OR gate 65 are applied to the input of an AND gate 73 whose output is also utilized to trigger the "trigger flip-flop" 72 when coincidence occurs. Each time the "trigger flip-flop" 72 is energized, its output will toggle back and forth between the normal and complementary outputs. The normal output of flip-flop 72 is utilized to enable the AND gate 67 so as to select the $b_0$ pulse and the complementary output thereof is utilized to enable the AND gate 66 so as to select the $b_\pi$ pulse.

To understand the operation of that portion of the "$\frac{1}{20}$-inch depth pulse generator" described thus far, refer to FIGURES 4A–4I where a timing diagram is shown illustrating the case where the true "½-inch incremental depth pulses" $a$ are speeding up. The pulses designated A, $a$, $b_0$, $b_\pi$ and $b$ are shown in FIGURES 4A–4E respectively. Assuming that the "trigger flip-flop" 72 is initially in its normal state, as shown in FIGURE 4H, the pseudo ½-inch depth pulses $b_0$ are passed through the OR gate 65 to reset the "control flip-flop" 62. Since the trailing edges of the $a$ and $b$ pulses set and reset the "control flip-flop" 62, the normal output of flip-flop 62, shown in FIGURE 4F, should be exactly 180° out of phase with the pulses A generated from the optical slotted drum 20 and shaping circuits 50 to maintain synchronism between the true and pseudo ½-inch depth pulses. (Remember that the "on" and "off" time of these A pulses are set equal to one another through the slotted drum design, i.e., the slots of each track are at 1-inch intervals with a ¼-inch slot opening, the slots of the two tracks being staggered.) In the FIGURES 4A–4I situation where the true ½-inch depth pulses are speeding up, it can be seen that the normal output of "control flip-flop" 62 no longer is exactly 180° out of phase with the A pulses. By comparing the A pulses with the normal output of "control flip-flop" 62, it can be seen how the "increase speed" signals of FIGURE 4I are generated from AND gates 63 during the coincidence of these two pulses of FIGURES 4A and 4F.

With the true ½-inch depth pulses speeding up, there is a danger that two true ½-inch depth pulses will occur between adjacent reset pulses ($b$). In this event, the "increase speed" pulses of FIGURE 4I would suddenly drop to zero and then gradually begin increasing in width again, which would cause undesirable fluctuations in the control voltage applied to the oscillator 61. The pulse 75 of FIGURE 4B represents just such an occurrence. To prevent this from happening, the "trigger flip-flop" 72 charges the phase of the pseudo ½-inch depth pulses $b$ by selecting the other pulse $b_\pi$ when two $a$ pulses occur before one $b$ pulse. The AND gate 71 detects this occurrence to cause "trigger flip-flop" 72 to change states, and to select the $b_\pi$ pulses via AND gate 66. By comparing FIGURES 4B and 4F, it can be seen how the trigger pulse of FIGURE 4G is generated from AND gate 71 to cause "trigger flip-flop" 72 to change states, as represented in FIGURE 4H. By so doing, the "increased speed" signals from AND gate 63 will decrease in pulse width at a slow rate as desired, as shown in FIGURE 4I.

Now referring to FIGURES 5A–5I, there is represented the situation where the true ½-inch depth pulses $a$ are slowing down. FIGURES 5A–5E represent the A, $a$, $b_0$, $b_\pi$ and $b$ pulses respectively, the same as in FIGURES 4A–4E. However, FIGURE 5F represents the complementary output of "control flip-flop" 62 which is compared with the A pulses in AND gate 64 to produce the "decrease speed" signals of FIGURE 5I. By decreasing the oscillator 61 frequency, the true $a$ pulses and pseudo $b$ pulses can be made to remain in synchronism in this "slowing down" situation. However, when the true $a$ pulses begin slowing down, there is a danger that two $b$ pulses will occur before one $a$ pulse. To prevent this from affecting the smooth operation of the circuit, the AND gate 73 energizes the "trigger flip-flop" 72 upon the coincidence of a complementary output pulse from flip-flop 62 and a pseudo ½-inch depth pulse $b$. This situation is represented by the pulse 76 of FIGURE 5C, which produces the output pulse of AND gate 73 shown in FIGURE 5G. By comparing FIGURES 5G and 5H, it can be seen that this pulse of FIGURE 5G triggers the "trigger flip-flop" 72 to enable the system to utilize the $b_\pi$ pseudo ½-inch depth pulses instead of the $b_0$ pulses.

Now referring back to FIGURE 2, to explain how the "increase speed" and "decrease speed" command signals from AND gates 63 and 64 cause the frequency of the "1/20-inch depth pulses" to increase or decrease, the "increase speed" pulses from AND gate 63 energize a gate 80 which causes a capacitor 81 to charge through a resistor 82 from a positive voltage supply. In like fashion, the "decrease speed" command from AND gate 64 energizes a gate 83 which causes the capacitor 81 to discharge to a negative supply through a resistor 84. The voltage on capacitor 81 controls the frequency of the voltage controlled oscillator 61 by suitable means. Thus, it can be seen that the time period during which the gates 80 or 83 are energized will control the voltage across capacitor 81 through the action of the capacitor charging or discharging through the resistors 82 and 84. These "1/20-inch depth pulses" are supplied to the programmer 38 along with being returned to the "divide by 10" circuit 68, as discussed previously.

Another way of looking at the operation of the "1/20-inch depth pulse generator" 59 is to consider the cable movement pulses, i.e., the square wave signal A, as being compared in phase with the output square wave signal from the "divide by 10" counter 68. The remaining circuitry of the "1/20-inch depth pulse generator" operates to maintain the frequency of oscillator 61 such that a desired phase relationship is maintained between these two signals. Thus, comparing the cable movement pulses A (which constitute pretty much a square wave) of FIGURE 4A with the square wave from the "divide by 10" counter 68 which produces the 0° and 180° $b_0$ and $b_\pi$ pulses of FIGURES 4C and 4D (this square wave can be drawn using $b_0$ and $b_\pi$), it can be seen that initially in FIGURE 4, a desired phase relationship is maintained between these two signals. Then, when the frequency of the A (or $a$) pulses increases, this phase relationship is disturbed. It is this change in the desired phase relationship which causes the adjustment of the frequency of the signal produced by oscillator 61. To ease this phase detection or comparison operation, one edge of the A pulses, i.e., the $a$ pulses, and one edge of the divided frequency square wave signal, i.e., the $b$ pulses are used to set and reset the "control flip-flop" 62 and the output pulses therefrom (the signal of FIGURE 4F) are compared with the cable movement signal A. By so doing, one edge of these two signals of FIGURES 4A and 4F remain synchronous and only the overlap pulse portion need be detected by AND gates 63 and 64. To determine whether the ½-inch depth pulses are speeding up or slowing down, the inverted A and A signals are both compared with the signal of FIGURE 4F from "control flip-flop" 62.

If the A signal and divided frequency signal from counter 68 should become more than 180° phase shifted from their desired phase relationship, undesired results will occur as discussed earlier. To prevent these undesired results from occurring, the $a$ and $b$ pulses, and the normal and complementary outputs of "control flip-flop" 62 are utilized by AND gates 71 and 73 and "trigger flip-flop" 72 to determine when this 180° phase shift has occurred. Then the $b_0$ or $b_\pi$ pulse not previously used, is selected as the $b$ pulse to enable smooth operation of the frequency control portion of the "1/20-inch depth pulse generator" 59.

One other feature of the depth pulse generator of FIGURE 2 concerns the speed detector discharge circuitry. It is possible that when the exploring device 10 of FIGURE 1 is stopped in the borehole, the optical slotted drum 20 will stop in a position such that one of photocells 25 will receive light through one of the slots of the drum and thus the output of OR gate 56 will be at a logical "1" level. If, at the same time, the "control flip-flop" 62 is in its normal or set state, an "increase speed" command will be continuously supplied from AND gate 63 to gate 80 thus charging capacitor 81 fully and causing the erroneous generation of "1/20-inch depth pulses."

To prevent this from happening, the "speed detector discharge one-shot" 58 generates a relatively short time duration pulse for each A pulse from OR gate 56 which enables a gate circuit 85. The gate circuit 85 discharges a capacitor 86 to ground, which capacitor had previously been charging up through a resistor 87. The voltage across the capacitor 86 is supplied to the control terminal of a gate circuit 88 which, when energized, clamps the capacitor 81 to ground, thus disabling the voltage controlled oscillator 61. Thus, it can be seen that so long as pulses are being generated from the shaping circuits 50, the "speed detector discharge one-shot" 58 will operate in conjunction with the gate circuit 85 to prevent the capacitor 86 from charging up to the threshold voltage of the gate 88. However, when no more pulses are generated from the shaping circuits 50, regardless of the logic level output of OR gate 56, the capacitor 86 will proceed to charge up through resistor 87 to the voltage necessary to enable gate circuit 88 to shut off the voltage controlled oscillator 61.

It can thus be seen that circuitry has been provided for generating incremental depth pulses at a rate exceeding the rate of pulses produced by the optical slotted drum. By so doing, the FIGURE 1 tape recorder can sample and process regular logging signals at a relatively slow rate, i.e., ½-inch depth increments, to give the analog-to-digital converter 37 plenty of time to operate, thus providing great amplitude resolution. Moreover, the dipmeter signals can be sampled and processed at a very fast rate while using the same tape recorder that processed the regular logging signals. By using the ½-inch depth pulses to produce the "1/20-inch depth pulses" a sudden backlash or reversal of the cable 11 will not produce a gush of erroneous "1/20-inch pulses" as might happen if the drum slots were spaced 1/20 of an inch apart.

While there has been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. Apparatus for generating pulses representative of the movement of a cable supported well tool through a borehole, comprising:
   means responsive to the movement of a cable for generating first pulses having a frequency representative of the rate of cable movement;
   means responsive to a frequency control signal for generating second pulses at a multiple of the frequency of said first pulses;
   means for dividing the second pulses in frequency so that the divided frequency pulses will be near the frequency of said first pulses; and
   means for comparing the first pulses with the divided frequency pulses to produce said frequency control signal for application to said second pulse generating means to control the frequency of said second pulses so that the frequency of said first pulses will be substantially the same as the frequency of the divided frequency pulses and the multiple frequency pulses will accurately reflect the rate of cable movement.

2. The apparatus of claim 1 wherein the first pulses each have a pulse width representative of the rate of cable movement and wherein said comparing means includes means responsive to said first pulses and said divided frequency pulses for generating third pulses which each have a pulse width representative of a time relationship between said first and divided frequency pulses, and means for comparing said third pulses with said first pulses to produce frequency control pulses each having a pulse width representative of a phase relationship between said first and third pulses, and means responsive to said frequency control pulses for producing said control signal, said control signal operating to adjust the frequency of said second pulses until said first and third pulses have a selected phase relationship.

3. The apparatus of claim 2 wherein said frequency dividing means includes counting means for counting said second pulses to produce a square wave signal having a frequency which is near the frequency of said first pulses; and wherein said comparing means includes means for producing individual 0° and 180° pulses in response to the 0° and 180° phase components of said square wave signal, said third pulse generating means includes gating means for selecting one of the 0° or 180° pulses for use in combination with said first pulses for producing said third pulses, and means responsive to said first, third, and selected 0° or 180° pulses for energizing said gating means to switch from one of the 0° or 180° pulses to the other when the phase difference between said first pulses and said square wave exceeds a predetermined amount.

4. The apparatus of claim 2 wherein said first pulse generating means includes slotted rotational means coupled with a cable for rotation as a function of cable movement, radiant energy generating means on one side of the slots of said slotted rotational means, and radiant energy detecting means located on the other side of the slots of said slotted rotational means for producing said first pulses representative of said rotation and rate of cable movement, said slots being arranged so that said first pulses will take the form of a substantially symmetrical square wave signal; and wherein said third pulse generating means is responsive to the phase relationship between said square wave signal and said divided frequency signal for producing said third pulses.

5. The apparatus of claim 2 wherein said frequency control pulse producing means comprises means for inverting said first pulses, and means for comparing said third pulses individually with said first pulses and said inverted first pulses for producing increase frequency or decrease frequency control pulses in accordance with whether the frequency of the divided frequency pulses are increasing or decreasing relative to the frequency of said first pulses.

6. The apparatus of claim 5 wherein said control signal producing means includes charge storage means, means responsive to one of said increase or decrease frequency control pulses for adding charge to said charge storage means, means responsive to the other of said frequency control pulses for substracting charge from said charge storage means, the amount of charge on said charge storage means comprising said frequency control signal.

7. The apparatus of claim 6 and further including means responsive to the absence of any of said first pulses over a given time interval for discharging said charge storage means to a given level to thereby terminate the generation of multiple frequency pulses.

8. The apparatus of claim 1 and further including means coupled to said first pulse generating means for terminating the generation of said multiple frequency pulses once cable movement has terminated.

9. The apparatus of claim 1 and further including means responsive to the absence of any of said first pulses over a given time interval for terminating the generation of said multiple frequency pulses so that said multiple frequency pulses will not be generated once cable movement has terminated.

10. The apparatus of claim 1 wherein said first pulse generating means includes slotted rotational means coupled with a cable for rotation as a function of cable movement, radiant energy generating means on one side of the slots of said slotted rotational means, and radiant energy detecting means located on the other side of the slots of said slotted rotational means for producing said first pulses representative of said rotation and rate of cable movement; and further including means responsive to the absence of any of said first pulses over a given time interval for terminating the generation of said multiple frequency pulses so that said multiple frequency pulses will not be generated once the cable has stopped moving.

11. Apparatus for generating pulses representative of the movement of a cable supported well tool through a borehole, comprising:
    means responsive to the movement of a cable for generating first pulses having a frequency and pulse width representative of the rate of cable movement;
    means responsive to a control signal for generating second pulses at a multiple of the frequency of said first pulses;
    means for dividing the second pulses in frequency by a factor such that the divided frequency pulses will be near the frequency of said first pulses;
    means for comparing the time relationship between one edge of each of said first pulses with a selected edge of said divided frequency pulses to produce third pulses having a pulse width representative of this time relationship; and
    means for comparing the phase difference between said first and third pulses and producing said control signal, said control signal being representative of said phase difference for operating to adjust the frequency and phase of said second pulses until said phase difference assumes a desired value so that the multiple frequency pulses will accurately reflect the rate of cable movement.

12. Apparatus for generating a signal representative of the movement of a cable supported well tool through a borehole, comprising:
    means responsive to the movement of a cable for generating a cable movement signal having a frequency representative of the rate of cable movement;
    means responsive to a control signal for generating a multiple frequency signal at a multiple of the frequency of said cable movement signal;
    means for dividing the multiple frequency signal in frequency so that the frequency of the divided frequency signal will be near the frequency of said cable movement signal; and means for comparing said cable movement signal with said divided frequency signal to produce said control signal for application to said multiple frequency signal generating means to control the frequency of said multiple frequency signal so that said divided frequency will be substantially the same as the frequency of said cable movement signal and the frequency of the multiple frequency signal will accurately reflect the rate of cable movement.

13. The apparatus of claim 12 wherein said comparing means includes means responsive to the divided frequency signal for producing 0° and 180° phase signals representative of the 0° and 180° phase components of said divided frequency signal, means for selecting one of the 0° or 180° phase signals and comparing said selected signal with said cable movement signal to generate an output signal representative of the phase relationship between said selected signal and cable movement signal, means for energizing said selected means to switch from one of the 0° or 180° phase signals to the other upon the phase difference between said selected signal and cable movement signal exceeding a predetermined amount, and means responsive to said output signal for producing said control signal, said control signal operating to maintain a desired phase relationship between said divided frequency and cable movement signals.

14. Apparatus for generating a signal representative of the movement of a cable supported well tool through a borehole, comprising:
    means responsive to the movement of a cable for generating a substantially square wave cable movement signal having a frequency representative of the rate of cable movement;
    means responsive to a control signal for generating a multiple frequency square wave signal at a multiple of the frequency of said cable movement signal;
    means for frequency dividing the multiple frequency so that the divided frequency signal will be near the frequency of said cable movement signal; and
    means for comparing the phase of the cable movement signal with the phase of the divided frequency signal to produce said control signal for application to said multiple frequency signal generating means to control the frequency of said multiple frequency signal so that the frequency of said divided frequency signal will be substantially the same as the frequency of the cable movement signal and the frequency of the multiple frequency signal will accurately reflect the rate of cable movement.

15. The apparatus of claim 14 wherein said comparing means includes bistable means operated by a selected edge of said divided frequency signal and one edge of said cable movement signal for generating a comparison pulse type signal, means for comparing the phase of said comparison signal with the phase of said cable movement signal to produce said control signal, said control signal operating on said multiple frequency signal generating means to maintain a desired phase relationship between said cable movement and divided frequency signals.

16. The apparatus of claim 15 wherein said means for comparing the phase of the comparison signal with the phase of the cable movement signal includes means for inverting the polarity of said cable movement signal, means for individually comparing the phase relationship of said comparison signal with said cable movement and inverted cable movement signals to produce increase frequency and decrease frequency control pulses, and means responsive to said increase and decrease frequency control pulse for producing said frequency control signal.

17. The apparatus of claim 14 and further including selection means for selecting one of the cable movement signal or multiple frequency signal for application to a utilization means as a signal representative of cable movement, the particular signal selected depending on the desired speed of operation of the utilization means.

18. Apparatus for generating a signal representative of the movement of a well tool through a borehole, comprising:
    means responsive to the movement of a cable for generating a square wave cable movement signal having a frequency representative of the rate of cable movement;
    means responsive to one of the rising or falling edges of said square wave cable movement signal for generating pulses, each having a fixed pulse width;
    means responsive to a control signal for generating a multiple frequency signal at a multiple of the frequency of said first pulses;
    means for frequency dividing the multiple frequency signal so that the frequency of the divided frequency signal will be near the frequency of said cable movement signal;
    means responsive to the 0° and 180° phase points of said divided frequency signal for producing 0° and 180° phase pulses;
    gating means for selecting one of said 0° or 180° phase pulses;
    bistable means operated by said fixed width pulses and said selected phase pulses for generating a second square wave signal whose phasing is representative of a phase relationship between said cable movement and divided frequency signals;
    means for comparing the phase relationship between said cable movement and second square wave signals to produce said control signal for controlling the frequency of said multiple frequency signal so that the frequency of the multiple frequency signal will accurately reflect the rate of cable movement; and
    means responsive to said selected phase pulses, fixed width pulses, and second square wave signal for energizing said gating means to select the other one of said phase pulses upon the successive occurrence of two of said selected phase pulses or fixed width pulses before the occurrence of the other of said pulses.

19. A method of generating a signal representative of the movement of a cable supported well tool through a borehole, comprising:
    moving a well tool through a borehole;
    generating a cable movement signal having a freqeuncy representative of the rate of cable movement;
    generating a multiple frequency signal at a multiple of the frequency of said cable movement signal in response to a control signal;
    frequency dividing the multiple frequency signal so that the frequency of the divided frequency signal will be near the frequency of said cable movement signal; and
    comparing the cable movement signal with the divided frequency signal to produce said control signal for use in controlling the frequency of said multiple frequency signal so that the frequency of said divided frequency signal will be substantially the same as the frequency of the cable movement signal and the frequency of the multiple frequency signal will accurately reflect the rate of cable movement.

20. The method of claim 19 and further including terminating the generation of said multiple frequency pulses in response to the absence of any of said first pulses over a given time interval so that said multiple frequency pulses will not be generated once cable movement has terminated.

21. The method of claim 19 wherein the step of comparing includes the steps of producing 0° and 180° phase signals representative of the 0° and 180° phase components of said divided frequency signal, selecting one of the 0° or 180° phase signals and comparing said selected signal with said cable movement signal to generate an output signal representative of the phase relationship between said selected signal and cable movement signal, switching from the selected one of the 0° or 180° phase signals to the other upon the phase difference between said selected signal and cable movement signal exceeding a prenetermined amount, and producing said control signal in response to said control signal, said control signal operating to maintain a desired phase relationship between said divided frequency cable and movement signals.

22. A method of generating pulses representative of the movement of a cable supported well tool through a borehole, comprising:
generating first pulses having a frequency and pulse width representative of the rate of cable movement in response to the movement of a cable;
generating second pulses at a multiple of the frequency of said first pulses in response to a control signal;
dividing the second pulses in frequency so that the divided frequency pulses will be near the frequency of said first pulses;
comparing the time relationship between one edge of each of said first pulses with a selected edge of said divided frequency pulses to produce third pulses having a pulse width representative of this time relationship; and
comparing the phase difference between said first and third pulses and producing said control signal, said control signal being representative of said phase difference for operating to adjust the frequency and phase of said second pulses until said phase difference assumes a desired value so that the multiple frequency pulses will accurately reflect the rate of cable movement.

23. A method of generating a signal representative of the movement of a cable supported well tool through a borehole, comprising:
moving a cable supported well tool through a borehole;
generating a substantially square wave cable movement signal having a frequency representative of the rate of movement of the cable;
generating a multiple frequency square wave signal at a multiple of the frequency of said cable movement signal;
frequency dividing the multiple frequency so that the divided frequency signal will be near the frequency of said cable movement signal; and
comparing the phase of the cable movement signal with the phase of the divided frequency signal to control the frequency of said multiple frequency signal so that the frequency of said divided frequency signal will be substantially the same as the frequency of the cable movement signal and the frequency of the multiple frequency signal will accurately reflect the rate of cable movement.

24. The method of claim 23 wherein the step of comparing includes generating a comparison signal having a phase relationship determined by a selected edge of said divided frequency signal and one edge of said cable movement signal, comparing the phase of said comparison signal with the phase of said cable movement signal to control the frequency of said multiple frequency signal so that a desired phase relationship will be maintained between said cable movement and divided frequency signals.

25. The method of claim 24 wherein the step of comparing the phase of the comparison signal with the phase of the cable movement signal includes the steps of inverting the polarity of said cable movement signal, individually comparing the phase relationships of said comparison signal with said cable movement and inverted cable movement signals to produce increase frequency and decrease frequency control pulses, and producing said frequency control signal in response to said increase and decrease frequency control pulses.

References Cited

UNITED STATES PATENTS

| | | | |
|---|---|---|---|
| 2,725,554 | 11/1955 | Phillips et al. | 346—134 X |
| 2,879,126 | 3/1959 | James. | |
| 3,333,237 | 7/1967 | Chapman | 340—18 X |

JERRY W. MYRACLE, Primary Examiner

U.S. Cl. X.R.

340—18